Figure 1:
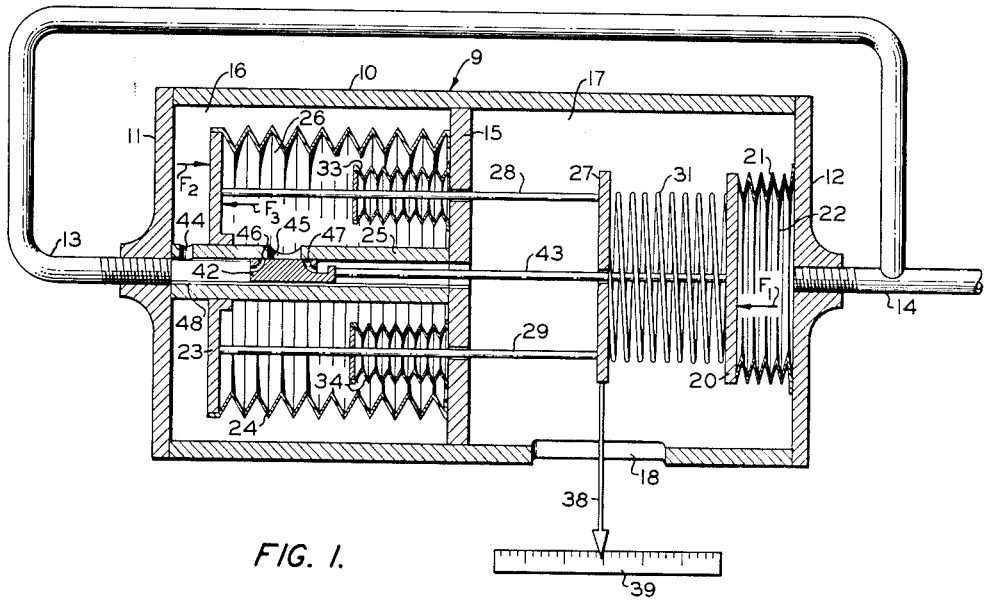

Dec. 27, 1955     A. H. BLAIR     2,728,231
PRESSURE MEASURING DEVICE
Filed May 10, 1951

INVENTOR.
A. H. BLAIR
BY *Hudson & Young*
ATTORNEYS

United States Patent Office 2,728,231
Patented Dec. 27, 1955

2,728,231

PRESSURE MEASURING DEVICE

Allen H. Blair, Sweeny, Tex., assignor to Phillips Petroleum Company, a corporation of Delaware Application May 10, 1951, Serial No. 225,601

9 Claims. (Cl. 73—407)

This invention relates to fluid pressure indicating means. In another aspect it relates to pressure balancing gages for measuring gaseous pressure.

It is well known that in various fields of physical measurement the so-called null balance methods furnish extremely accurate means for determining numerous quantities. The word "null" is generally thought of in terms of electrical circuits, particularly bridge and potentiometer circuits wherein the difference between two opposing voltages is indicated by the deflection of a galvanometer. The accuracy of this method relies upon the known fact that differences between two quantities can be determined much more accurately than the absolute magnitude of either quantity alone. It is toward a utilization of this null balance principle in the field of fluid pressure measurement that the present invention is primarily concerned.

The most common pressure measuring devices generally used today are of the displacement type in which some sort of bellows element assumes a position responsive to the magnitude of the pressure being measured. It is of course known that this displacement method of measuring fluid pressure has certain disadvantages of which the following are illustrative: the flexible member, such as the diaphragm or metallic bellows, required to detect changes in the measured pressure is often subject to non-linear characteristics with changes in pressure; it is extremely difficult to devise an instrument of this sort which is responsive to small changes in pressure without impairing the design by utilizing a long travel of the measuring element; and various sources of friction are introduced by the use of pivots, bearings, and slide members which are required to change the bellows displacement into a deflection on the measuring gage.

It is therefore an object of the present invention to provide an improved pressure measuring gage, employing a null balance principle, which is sensitive to small differences of pressure being measured.

It is a further object to provide a pressure measuring gage wherein frictional forces inherent in pressure measuring devices are overcome by the use of a second balancing force.

A still further object is to provide a pressure gage which is rugged in construction, simple in operation, reliable in result, and which employs a minimum number of moving elements.

Figure 2:
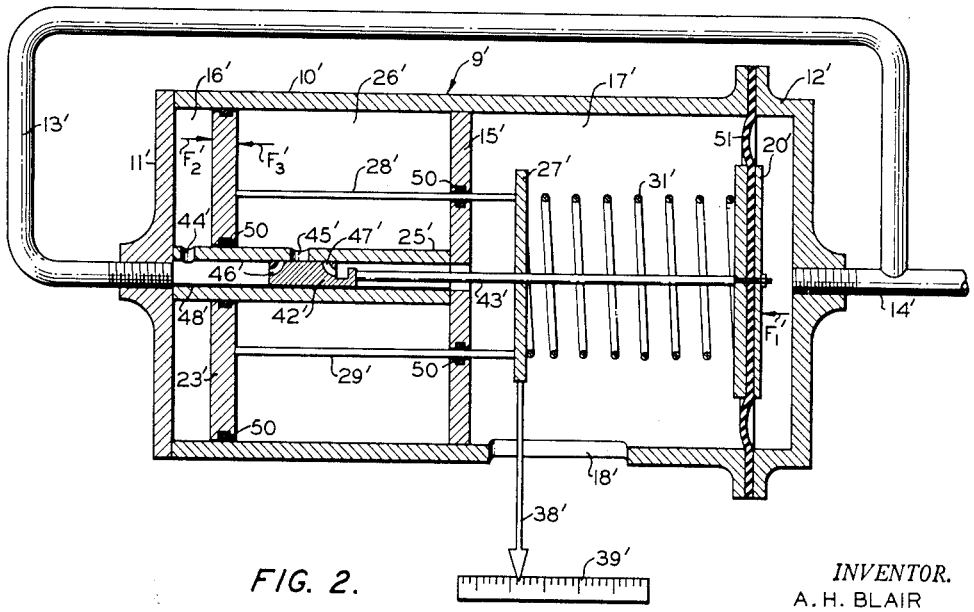

Various other objects, advantages and features of this invention will become apparent from the following detailed description taken in conjunction with the accompanying drawing illustrating a preferred embodiment of the invention in which:

Figure 1, shown partially in section, illustrates a suitable pressure gage for carrying out this invention; and Figure 2 shows a modification of the gage illustrated in Figure 1.

Referring now to the drawings in detail and to Figure 1 in particular, there is shown a housing element 9 of a pressure gage formed by cylindrical wall 10 and circular end plates 11 and 12. Fixed to circular plates 11 and 12 are conduits 13 and 14, respectively, which are directly connected to one another and attached to a source of fluid (not shown), whose pressure is to be determined. A circular wall 15 is secured within housing 9 and so positioned therein as to divide housing 9 into two pressure tight chambers 16 and 17, to the left and right of wall 15, respectively. Chamber 17 is at atmospheric pressure due to an opening 18 in housing wall 10 which exposes said chamber to the atmosphere in which housing 9 is located. A movable diaphragm 20 is positioned in the right section of housing 9 and secured to wall 12 of said housing by means of a flexible fluid tight bellows 21. Diaphragm 20 and bellows 21 thus form a chamber 22 which is directly connected to and under pressure of the fluid being measured. In the left half of housing 9 there is positioned a movable piston 23 which is secured to wall 15 by means of a flexible fluid tight bellows 24. In addition, wall 15 is connected to end plate 11 by means of a cylindrical shaft 25 about which piston 23 makes slidable pressure tight contact. Thus, bellows 24, cylindrical shaft 25, wall 15, and piston 23 form a fluid tight chamber 26 which is located within chamber 16 in the left section of housing 9. A second piston 27 is positioned in the right section of housing 9 and is secured to piston 23 by means of rigid connecting rods such as 28 and 29. A coil spring expansion means 31 is positioned between diaphragm 20 and piston 27 so as to exert a force tending to keep these last mentioned elements apart. Such coil springs 31 are well known in the prior art as being compressible elastic variable length expansion means. Suitable flexible bellows 33 and 34 are secured to connecting rods 28 and 29, respectively, and to wall 15, thereby making fluid tight connections between said rods and said wall. In addition, a pointer 38 is rigidly fastened to piston 27 and adapted to move therewith. The position of pointer 38 is indicated on scale 39 which may be calibrated in terms of the pressure of a fluid being measured.

A valve 42 is attached to diaphragm 20 by means of rod 43 and positioned within cylindrical member 25 to oscillate therein in accordance with movement of diaphragm 20. An opening 44 in member 25 enables chamber 16 to remain under pressure of the fluid being measured at all times, while opening 45 in member 25 enables chamber 26 to acquire various pressures depending upon the position of valve 42. In the position illustrated opening 45 is sealed by valve 42, but if valve 42 moves to the right, chamber 26 becomes exposed to the pressure being measured through port 46 in valve 42. On the other hand, if valve 42 moves to the left chamber 26 becomes exposed to atmospheric pressure through a second port 47 in valve 42. A guide member 48 keeps valve 42 from rotating so that said ports retain proper alignment with respect to opening 45.

It can thus be seen that housing 9 is divided into four chambers, the first chamber 22 is under pressure of the fluid being measured, the second chamber 16 is likewise under pressure of the fluid being measured, chamber 17 remains at atmospheric pressure due to opening 18, and, finally, depending upon the position of valve 42, chamber 26 is at some pressure intermediate the pressure being measured and atmospheric pressure.

The operation of this pressure gage so far described may be explained in the following manner. The pressure of the fluid being measured is applied through conduit 14 into chamber 22 wherein it exerts a force $F_1$ on diaphragm 20 in the direction illustrated (toward the left). The same fluid pressure is applied through conduit 13 to chamber 16 wherein it exerts a second force $F_2$ on piston 23 in the direction illustrated (toward the right). Since diaphragm 20 and piston 23 are connected to one another by means of rods 28 and 29, piston 27 and coiled spring 31; forces $F_1$ and $F_2$ tend to oppose one another. Since the cross sectional area of piston 23 is greater than the cross sectional area of diaphragm 20, the magnitude of force $F_2$ is greater than the magnitude of force $F_1$, with the result that there is a tendency for piston 27 to move in the direction of force $F_2$. A portion of the difference in force between $F_2$ and $F_1$ is used in overcoming the frictional forces tending to resist this motion; however, the remaining differences in force tend to compress spring 31 a definite amount, this compression depending upon the properties of the spring and the magnitude in the forces applied thereto. The instrument is so designed that force $F_2$ even after overcoming friction is still greater than force $F_1$, with the result that diaphragm 20 is moved somewhat in the direction of force $F_2$. This motion of diaphragm 20, however, moves valve 42 to such a position as to allow entry of the fluid being measured into chamber 26 through port 46. The fluid pressure within chamber 26 exerts a third force $F_3$ on piston 23 in a direction (to the left) tending to oppose force $F_2$. The fluid continues to enter chamber 26 thereby moving diaphragm 20 and piston 23 to the left until the total force of $F_1$ plus $F_3$ is equal to force $F_2$, at which point motion of diaphragm 20 ceases with valve 42 being once more closed. Under this condition of equilibrium there is no resultant movement of piston 27 or pointer 38 attached thereto. The position of pointer 38 on scale 39 gives an indication of the pressure being measured. As long as the designated measured pressure remains constant the pressure gage remains at equilibrium with no resultant motion of any of the pistons therein.

In the event of a decrease in pressure of the fluid being measured the operation of the pressure gage is as follows: both forces $F_1$ and $F_2$ are now decreased resulting in an expansion of spring 31 which tends to move piston 23 toward the left, that is, in the direction of force $F_3$. When the force exerted on diaphragm 20 is less than force $F_1$, there is motion of diaphragm 20 in the direction of $F_1$ which in turn moves valve 42 to such a position that chamber 26 is connected directly through port 47 to the atmospheric pressure in chamber 17. This venting action decreases the magnitude of force $F_3$ which has the same effect as a net increase in force $F_2$, and this in turn stops the motion of piston 23. At this point opening 45 is closed and the system is once more in equilibrium with pointer 38 giving an indication of the pressure being measured. For accurate results it is important that the movement of valve 42 be small compared to the movement of pointer 38.

It can thus be seen that valve 42 may assume one of three positions: the first is a central position in which no fluid can pass either in or out of chamber 26; the second position is to the right of center in which the pressure being measured is applied to chamber 26 through port 46 so as to increase force $F_3$; and, finally, the third position is to the left of center in which chamber 26 is directly connected to the atmosphere through port 47 so as to vent said chamber. Whenever the force exerted by spring 31 on diaphragm 20 is less than force $F_1$, valve 42 is venting and piston 23 is moving so as to increase the compression force on spring 31. Whenever the opposing forces are equal, valve 42 is closed, there being no motion unless the measured force changes. Whenever the force of spring 31 on diaphragm 20 exceeds force $F_1$, valve 42 is in such a position as to apply the measured pressure into chamber 26 which decreases the net force in the direction of $F_2$ and piston 23 is moved in such a direction as to decrease the spring force. It should be noted that the net force exerted to the right on spring 31 is force $F_2$ minus force $F_3$ minus frictional forces.

With reference to Figure 2 there is shown a modified form of the pressure gage of Figure 1 wherein parts similar to those shown in Figure 1 have been designated by like primed reference numerals. The overall construction and operation of this second gage is identical to that shown in Figure 1, the only difference being the elimination of the pressure tight sealing bellows. In order to eliminate these bellows piston 23', cylindrical member 25', connecting rods 28' and 29', wall 15', and housing wall 10' are either carefully machined to make pressure tight slidable contact with one another or suitable sealing devices 50 are positioned at each slidable point of contact as shown. Bellows 21 of Figure 1 has been replaced by flexible member 51 which allows movement of diaphragm 20' while still connecting said diaphragm to housing walls 10' and 12' in a pressure tight manner. Otherwise the two gages are identical.

It should be pointed out that satisfactory operation of the pressure gage of this invention is not dependent upon balanced force $F_2$ being supplied by the pressure of the fluid being measured. Equally satisfactory results can be obtained if the force $F_2$ is supplied from a supplementary source of known or constant pressure in place of the measured pressure itself. The purpose of balanced force $F_2$ is to furnish power to compress spring 31 and overcome the frictional forces within the gage. The use of a supplementary source of air pressure is quite useful whenever venting into the atmosphere of the material whose pressure is being measured is objectionable. If the supplementary pressure is higher than that being measured, additional balancing power is available. In the measurement of high pressures the ratio of the cross sectional area of piston 23 to the cross sectional area of diaphragm 20 should be large, with a sturdy coil spring 31 being placed between piston 27 and diaphragm 20.

It should be apparent that this invention provides apparatus for measuring a fluid pressure which is extremely accurate in that a second balancing force is used to overcome the friction of forces inherent in all known pressure indicating devices; the gage herein described being extremely accurate in the measurement of small pressures since frictional forces have been largely eliminated. In addition to providing a direct indication of the pressure being measured, by the position of pointer 38 on scale 39, the pointer 38 may advantageously be employed to directly operate pressure responsive means such as switches, small valves, or other control devices. Through the elimination of gears, levers, etc. found in conventional pressure gages I have provided a gage capable of long and satisfactory operation. This gage is valuable in the measurement of rapidly fluctuating pressures.

While the foregoing description has been taken in conjunction with a preferred embodiment of this invention it should be apparent to those skilled in the art that various modifications in the form of the apparatus as illustrated can be made without departing from the scope of this invention.

I claim:

1. A fluid pressure indicating gage comprising, in combination, a housing enclosing first and second variable volume chambers having opposing movable walls of unequal cross-sectional area, the movable wall of said second chamber being of larger cross-sectional area than the movable wall of said first chamber, each of said chambers being under pressure of the fluid being measured, coiled spring expansion means disposed between and exerting a force on each of said movable walls, said last mentioned forces being in opposition to the forces exerted by said fluid being measured, a third variable volume chamber adjacent said second chamber, the movable wall of said second chamber being a movable wall of said third chamber, valved means for adjusting the pressure in said third chamber until said movable wall between said second and said third chambers remains stationary, and position indicating means connected to said last mentioned movable wall.

2. A fluid pressure indicating device comprising, in combination, first and second variable volume chambers having opposing movable walls of unequal cross-sectional area, the movable wall of said second chamber being of larger cross-sectional area than the movable wall of said first chamber, said chambers being under pressure of the fluid being measured, expansion means exerting opposing forces on the movable walls of said chambers, a third chamber adjacent said second chamber and having a movable wall common with the movable wall of said second chamber, said third chamber being under pressure intermediate said pressure being measured and an external reference pressure, and valved means for adjusting said pressure in said third chamber until the resulting force on the movable wall of said second chamber is zero.

3. Apparatus for measuring gaseous pressure comprising, in combination, first and second variable volume chambers having opposing movable walls of unequal cross-sectional area, each of said chambers being under pressure of the gas being measured, expansion means exerting a force on each of said movable walls opposing the forces exerted on said walls created by the gas pressure within said first and second chambers, a third chamber adjacent said second chamber and having a movable wall common with the movable wall of said second chamber, the movable wall of said second chamber being of larger cross-sectional area than the movable wall of said first chamber, said third chamber being at a pressure intermediate atmospheric pressure and the pressure of the gas being tested, and valved means for varying the pressure in said third chamber until the opposing forces on said common movable wall balance one another.

4. Fluid pressure indicating means comprising, in combination, first and second variable volume chambers, means for applying the pressure of the fluid to be measured continuously to both of said chambers, said chambers having opposing movable walls, the area of the movable wall of said second chamber being greater than the area of the movable wall of said first chamber, compressible elastic variable length expansion means interposed between said opposing movable walls and exerting one of two equal and opposite first forces on each of said walls in opposition to the forces on said walls created by the pressure of the fluid to be measured, and means exerting an adjustable second force on the movable wall of said second chamber in opposition to the fluid pressure exerted on said movable wall of said second chamber, said second force being of sufficient magnitude to balance the net resulting force on the movable wall of said second chamber.

5. Fluid pressure indicating apparatus comprising, in combination, two opposing movable walls, a compressible elastic variable length expansion member interposed between said movable walls and exerting equal first forces on said walls, means for exerting a second force on the first of said walls in opposition to the one of said first forces which is exerted on said first wall, said second force being created by the pressure of the fluid to be measured, means for exerting a third force on said second wall in opposition to the other of said first forces exerted on said second wall, the said means for exerting a second force and said means for exerting a third force being adapted to exert said forces continuously, said third force being greater than said second force and also being created by the pressure of the fluid to be measured, and means for applying a fourth force on said second wall opposing said third force, said fourth force being of magnitude equal to the difference between said first forces and third forces, and means to indicate the magnitude of the force exerted on said expansion member.

6. A pressure measuring gage comprising, in combination; a housing having an opening at each end thereof, said openings being adapted to be connected to the fluid whose pressure is to be measured; a first movable plate positioned in said housing in pressure-tight engagement with the walls thereof to form a first chamber, the interior of which communicates with the source of pressure to be measured through one of said openings; a second movable plate positioned in said housing in pressure-tight engagement with the walls thereof to form a second chamber, the interior of which is in communication with the source of fluid pressure to be measured through the second of said openings, said second plate having a larger cross-sectional area than said first plate; compressible elastic variable length expansion means positioned between and exerting a force against both said first plate and said second plate; a pressure-tight third chamber disposed within said housing and abutting said second plate, said third chamber being disposed between said first plate and said second plate; means for adjusting the pressure in said third chamber until the forces exerted on said second plate by said expansion means and the pressure in said third chamber are equal to the opposing force exerted on said second plate by the pressure of the fluid to be measured; and indicating means secured to said second plate to measure movement of said second plate.

7. The combination in accordance with claim 6 wherein said means for adjusting the pressure in said third chamber comprises a movable valve means permitting communication between said third chamber and the fluid pressure to be measured at a first position of the valve, said valve also permitting communication between said third chamber and a reference pressure at a second position of the valve, and means rigidly connecting said valve with said first plate at a fixed distance, the position of said valve being regulated by the position of said first plate so as to permit the plate to move the valve into one or the other of said positions, the first-mentioned communication being made when the effect of the pressure in the third and first chambers is insufficient to balance the effect of the pressure in the second chamber and vice versa, whereby the pressure in said third chamber is adjusted until the forces exerted on said second plate by the expansion means and the opposing fluid pressures thereon are balanced.

8. The combination in accordance with claim 6 wherein said first plate is connected to the walls of said housing by a first flexible bellows and said second plate is connected to the walls of said housing by a second flexible bellows.

9. The combination in accordance with claim 6 wherein said first plate is connected to the walls of said housing by a flexible diaphragm and said second plate is in slidable fluid-tight engagement with the walls of said housing.

References Cited in the file of this patent

UNITED STATES PATENTS

| | | |
|---|---|---|
| 1,369,568 | Smoot | Feb. 22, 1921 |
| 1,935,508 | Lanham | Nov. 14, 1933 |
| 2,511,752 | Tandler et al. | June 13, 1950 |

FOREIGN PATENTS

| | | |
|---|---|---|
| 615,619 | Great Britain | Jan. 10, 1949 |